United States Patent [19]
Shinonaga

[11] Patent Number: 5,537,331
[45] Date of Patent: Jul. 16, 1996

[54] METHOD OF TESTING DEVICES TO BE MEASURED AND TESTING SYSTEM THEREFOR

[75] Inventor: Naoyuki Shinonaga, Itami, Japan

[73] Assignee: Mitsubishi Denki Kabushiki Kaisha, Tokyo, Japan

[21] Appl. No.: 269,524

[22] Filed: Jul. 1, 1994

[30] Foreign Application Priority Data

Jul. 2, 1993 [JP] Japan .................................. 5-164586

[51] Int. Cl.⁶ .............................................. G01R 31/3183
[52] U.S. Cl. ........................... 364/489; 364/488; 364/490; 324/73.1
[58] Field of Search ................................ 364/488, 489, 364/490, 491, 578; 235/153; 324/158, 73 R, 157, 158 R, 73.1; 371/20, 15; 427/10; 29/832

[56] References Cited

U.S. PATENT DOCUMENTS

| | | | |
|---|---|---|---|
| 3,873,818 | 3/1975 | Barnard | 235/153 |
| 4,038,599 | 7/1977 | Bove et al. | 324/158 |
| 4,348,759 | 9/1982 | Schnurmann | 371/20 |
| 4,357,703 | 11/1982 | Van Brunt | 371/15 |
| 4,441,075 | 4/1984 | McMahon | 324/73 R |
| 4,578,279 | 3/1986 | Zingher | 427/10 |
| 4,727,310 | 2/1988 | Hashimoto et al. | 324/157 |
| 4,761,607 | 8/1988 | Shiragasawa et al. | 324/158 R |
| 5,103,557 | 4/1992 | Leedy | 29/832 |

OTHER PUBLICATIONS

"Testing VLSI Chips with Weighted Random Patterns", by J. Waicukauski and F. Motika, IEEE VLSI Technology, Systems and Applications Symposium, 1989, pp. 149–154.
"High Precision Testing Method of Mixed Signal Device", by A. Watanabe et al., IEEE Advanced Technologies in I & M, 1994, pp. 1284–1288.

*Primary Examiner*—Kevin J. Teska
*Assistant Examiner*—Russell W. Frejd
*Attorney, Agent, or Firm*—Leydig, Voit & Mayer

[57] ABSTRACT

Disclosed is a method of sequentially conducting a series of tests on devices to be measured starting with a first test up to an Nth test. The method comprises the step of conducting the tests on the plurality of devices to be measured concurrently in sequence starting with the first test. During that time, determination as to whether each of the devices to be measured is defective or non-defective is made each time the test is completed. If it is determined that any of the devices to be measured is defective after any of the series of tests is completed, that defective device alone is replaced with a new device to be measured, and the series of tests are restarted starting with a test subsequent to the test in which the defective device is generated.

5 Claims, 6 Drawing Sheets

METHOD OF TESTING DEVICES TO BE MEASURED AND TESTING SYSTEM THEREFOR

BACKGROUND OF THE INVENTION

1. Field of the Invention

The present invention relates to a method of testing devices to be measured, and a testing system therefor.

2. Description of the Related Art

A conventional testing system of the above-described type is shown in FIG. 4. A handler 9 is connected to an LSI tester 1. The LSI tester 1 includes a central processing unit (hereinafter referred to as a CPU) 2, a measuring unit 3 for performing measurements on four devices to be measured (hereinafter referred to as devices) 4a, 4b, 4c and 4d, and a storage unit 5. The storage unit 5 includes a program storing portion 6 for storing programs of tests starting with a first test and ending with an Nth test, and testable/non-testable information storing portions 13a, 13b, 13c and 13d for storing testable/non-testable information on the devices 4a, 4b, 4c and 4d. The measuring unit 3 is connected to contactors 8a, 8b, 8c and 8d, which are to be electrically brought into contact with the devices 4a, 4b, 4c and 4d.

The handler 9 is connected to the CPU 2 of the LSI tester 1 via a communication data bus 12. The handler 9 includes a conveying portion 14, and a control device 11 for performing control on the conveying portion 14. The conveying portion 14 is adapted to convey the devices 4a, 4b, 4c and 4d from predetermined waiting positions to the contactors 8a, 8b, 8c and 8d so as to allow the devices to be electrically brought into contact with the corresponding contactors before the test is started. The conveying portion 14 is also adapted to separate the devices 4a, 4b, 4c and 4d from the contactors 8a, 8b, 8c and 8d after the test has been completed. When the test is started, the conveying portion 14 of the handler 9 is activated by the control device 11 to bring the devices 4a, 4b, 4c and 4d into contact with the contactors 8a, 8b, 8c and 8d, respectively. Thereafter, the control device 11 transmits test start instruction data to the CPU 2 of the LSI tester 1. Upon receipt of the test start instruction data, the CPU 2 stores the testable data in the testable/non-testable data storing portions 13a, 13b, 13c and 13d. At the same time, the CPU 2 reads out the program of the first test from the program storing portion 6 of the storage unit 5 and activates the measuring unit 3 according to that program to perform the first test on the four devices 4a, 4b, 4c and 4d in step S1 shown in FIG. 5.

When the first test is completed, the CPU 2 determines on the basis of the results of the test whether the devices 4a, 4b, 4c and 4d are defective products or non-defective products in step S2. If all the devices are non-defective, the CPU 2 reads out the program of the second test from the program storing portion 6 in step S3 to perform the second test. Thereafter, the CPU 2 performs subsequent tests in a similar manner in steps S4 through S7 until the Nth test is completed.

When the Nth test is completed in step S7, the CPU 2 transmits test completion information data to the handler 9. The control device 11 of the handler 9 drives the conveying portion 14 to discharge the devices 4a, 4b, 4c and 4d from the contactors 8a, 8b, 8c and 8d, whereby the first test cycle is completed.

If it is determined in step S2 from the results of the first test that at least one of the four devices 4a, 4b, 4c and 4d is defective, the CPU 2 determines in step S8 whether or not all the devices are defective. If part of the devices are defective, the CPU 2 stores test suspension data in the testable/non-testable data storing portion 13a, 13b, 13c or 13d corresponding to the device the CPU 2 has judged defective in step S9, and then executes the second test in step S3.

Before each test is conducted, the CPU 2 reads out the testable/non-testable data corresponding to the respective devices from the testable/non-testable data storing portions 13a, 13b, 13c and 13d. The CPU 2 does not perform the test on the device in which the test suspension data is stored as the testable/non-testable data. Accordingly, the second test is not conducted on the device whose testable/non-testable data is the test suspension data. If it is determined in step S8 that all the devices are defective, the first test cycle is ended without the subsequent tests from the second to the Nth tests being executed.

If it is determined that at least one of the devices is defective when each test is completed, the CPU 2 similarly performs determination as to whether all the devices are defective and storage of the testable/non-testable data.

When the first test cycle is ended, the conveying portion 14 of the handler 9 brings four new devices to be tested into contact with the contactors 8a, 8b, 8c and 8d, and the control device 11 transmits the test start instruction data to the CPU 2 of the LSI tester 1 so as to allow the second test cycle to be started. The above-described operation continues until a Pth test cycle is completed.

An example of the actual operation will now be described with reference to the timing chart of FIG. 6. First, the devices 4a, 4b, 4c and 4d are electrically brought into contact with the contactors 8a, 8b, 8c and 8d, respectively, and then the first test cycle is executed on these four devices starting with the first test. It is determined from the results of the third test that the device 4b contacting the contactor 8b is defective, and execution of the fourth and subsequent tests on the device 4b is suspended. The device 4b waits for the completion of the first test cycle at the contactor 8b. Similarly, it is determined from the results of the fourth test that the device 4d contacting the contactor 8d is defective, and execution of the fifth and subsequent tests on the device 4d is suspended. The device 4d waits for the completion of the first test cycle at the contactor 8d. Regarding the remaining devices 4a and 4c, since it is determined that they are non-defective, the test is conducted thereon up to the last (Nth) test.

When the first test cycle is completed, the devices 4a, 4b, 4c and 4d are discharged from the contactors, and new four devices 4e, 4f, 4g and 4h are brought into contact with the contactors 8a, 8b, 8c and 8d. Thereafter, the second test cycle is started. In the example shown in FIG. 6, it is determined from the results of the fourth test that the device 4e is defective. Thus, execution of the fifth and subsequent tests on the device 4e is suspended. The device 4e waits from the completion of the second test cycle at the contactor 8a.

In recent years, there is a tendency that the number of functions and capacity of a device are increased. This increases the number of testing items and the time required for a single test item, thus increasing the time required for the entire test. In a conventional testing system, when it is determined during the test that the device is defective, that defective device waits for the completion of that test cycle at the corresponding contactor, thus reducing the processing ability of the testing system and increasing the testing cost.

SUMMARY OF THE INVENTION

Accordingly, an object of the present invention is to provide a method of testing devices to be measured which enables the processing ability of a testing system to be improved.

Another object of the present invention is to provide a testing system which enables the processing ability thereof to be improved.

In order to achieve the above objects, according to one aspect of the present invention, there is provided a method of sequentially conducting a series of tests on devices to be measured starting with a first test up to an Nth test. The method comprises the step of sequentially conducting the tests on the plurality of devices to be measured concurrently starting with the first test. During that time, determination as to whether each of the devices to be measured is defective or non-defective is made each time the test is completed. If it is determined that any of the devices to be measured is defective after any of the series of tests is completed, the defective device alone is replaced with a new device to be measured, and the series of tests are then restarted starting with a test subsequent to the test in which the defective device is generated.

According to another aspect of the present invention, there is provided a testing system which comprises a plurality of contactors with which a plurality of devices to be measured are electrically brought into contact, a measuring portion for testing the plurality of devices to be measured together through the plurality of contactors and for determining whether the devices to be measured are defective or non-defective, a program storing portion for storing programs of series of tests starting with a first test up to an Nth test, a plurality of defective test item storing portions provided in correspondence with the plurality of contactors for storing a test item with which the device to be measured which is brought into contact with the corresponding contactor is judged defective, a handler for conveying the devices to be measured and bringing the devices into contact with the corresponding contactors separately for each device, and a CPU for allowing the measuring portion to conduct the series of tests concurrently on the plurality of devices to be measured which are brought into contact with the plurality of contactors in sequence on the basis of the programs stored in the program storing portion. When it is determined by the measuring portion that any of the devices to be measured is defective after any of the series of tests is completed, the CPU stores a defecting test item in the defective test item storing portion corresponding to the device to be measured, allows the handler to replace the device to be measured alone with a new device to be measured, and allows the measuring portion to restart the series of tests starting from the test subsequent to the test.

DESCRIPTION OF THE PREFERRED EMBODIMENTS

An embodiment of the present invention will now be described below with reference to the accompanying drawings.

Figure 1:
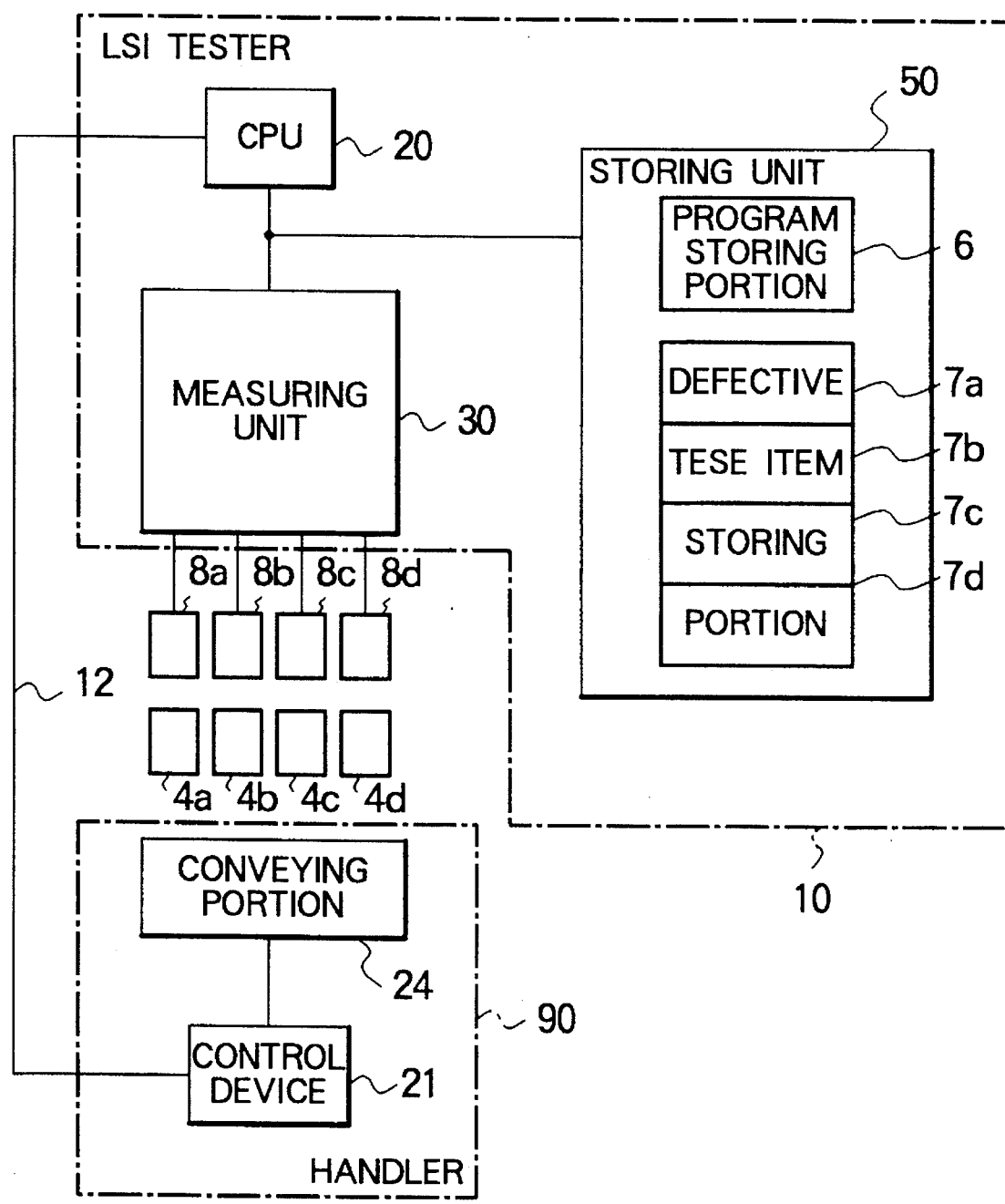
FIG. 1 is a block diagram showing a testing system according to an embodiment of the present invention.

In FIG. 1, the handler 90 is connected to the LSI tester 10. The LSI tester 10 includes a CPU 20, a measuring unit 30 for simultaneously performing measurements on four devices to be measured 4a, 4b, 4c and 4d, and a storage unit 50. The measuring unit 30 is connected to contactors 8a, 8b, 8c and 8d, which are to be electrically brought into contact with the devices 4a, 4b, 4c and 4d. The storing unit 50 includes a program storing portion 6 for storing the test programs of tests starting with a first test and ending with an Nth test, and defective test item data storing portions 7a, 7b, 7c and 7d for storing defective test item data on the devices respectively contacted with the contactors 8a, 8b, 8c and 8d.

The handler 90 is connected to the CPU 20 of the LSI tester 10 via a communication data bus 12. The handler 90 includes a conveying portion 24, and a control device 21 for performing control on the conveying portion 24. The conveying portion 24 is adapted to convey the devices 4a, 4b, 4c and 4d from predetermined waiting positions to the contactors 8a, 8b, 8c and 8d so as to allow the devices to be electrically brought into contact with the corresponding contactors before the test is started. The conveying portion 14 is also adapted to separate the devices 4a, 4b, 4c and 4d from the contactors 8a, 8b, 8c and 8d after the test has been completed. The conveying portion 24 can asynchronously perform a series of these operations separately on the devices.

Figure 2:
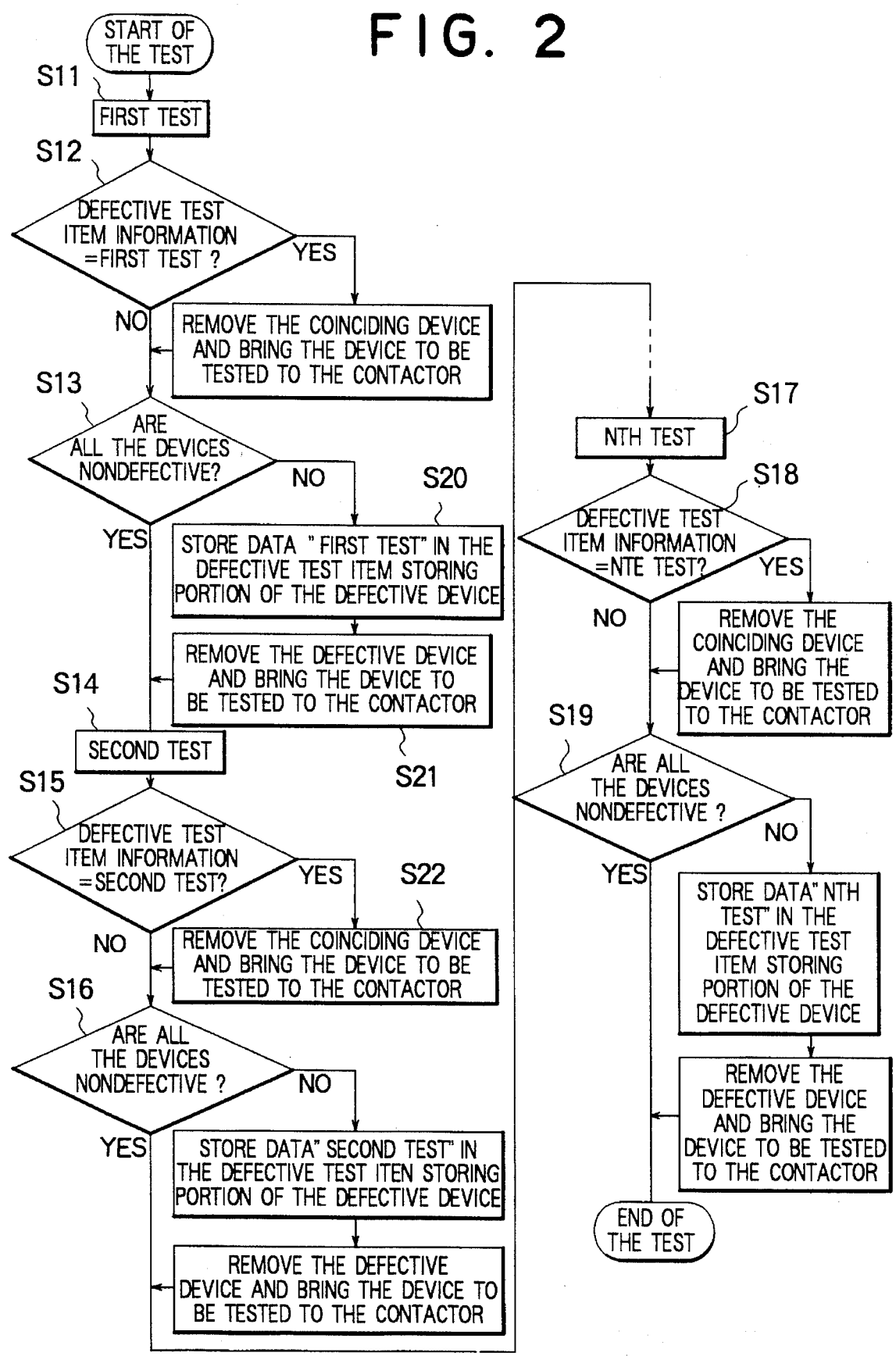
FIG. 2 is a flowchart showing the operation of the embodiment.

The operation of this embodiment will now be described with reference to the flowchart of FIG. 2. The programs of the tests starting with the first test and ending with the Nth test and the testing program for executing a series of operations shown in FIG. 2 are stored beforehand in the program storing portion 6 of the storing unit 50. Further, "the Nth test" is stored in each of the defective test item storing portions 7a, 7b, 7c and 7d of the storing unit 50 as the defective test item data.

When the test is started, the conveying portion 24 of the handler 90 is activated by the control device 21 to bring the devices 4a, 4b, 4c and 4d into contact with the contactors 8a, 8b, 8c and 8d, respectively. Thereafter, the control device 21 transmits test start instruction data to the CPU 20 of the LSI tester 10. Upon receipt of the test start instruction data, the CPU 20 reads out the program for the first test from the program storing portion 6 of the storing unit 50 and activates the measuring unit 30 according to that program to perform the first test on the four devices 4a, 4b, 4c and 4d in step S11 shown in FIG. 2.

When the first test is completed, the CPU 20 reads out in step S12 the defective test item data stored in the defective test item storing portions 7a, 7b, 7c and 7d of the storing unit 50, and determines whether or not there is any defective test item data which coincides with the completed test item, i.e., the first test, in this case. As mentioned above, since "the Nth test" is stored in the defective test item storing portions 7a, 7b, 7c and 7d beforehand, there is no defective test item data which coincides with the completed test item.

Next, the CPU 20 determines on the basis of the results of the test whether the devices 4a, 4b, 4c and 4d are defective in step S13. If all the devices are non-defective, the CPU 20 reads out the program of the second test from the program storing portion 6 in step S14 and performs the second test. Thereafter, the CPU 20 performs subsequent tests in a similar manner in steps S15 through S19 until the Nth test is completed.

If it is determined from the results of the test that at least one of the devices 4a, 4b, 4c and 4d is defective in step S13, the CPU 20 suspends execution of the test temporarily, and stores data "the first test" in the defective test item storing portion corresponding to that defective device in step S20. Thereafter, in step S21, the CPU 20 transmits both the test completion information data and the data on the contactor contacting the device which has been judged defective to the control device 21 of the handler 90. In step S21, the control device 21 drives the conveying portion 24 to remove the defective device contacting that contactor and bring a new device to be tested into contact with that contactor. Thereafter, the control device 21 transmits the test start instruction data to the CPU 20.

Upon receipt of the test start instruction data, the CPU 20 reads out the program for the second test from the program storing portion 6 of the storing unit 50, and executes the second test in step S14. Thus, when a defective device is generated, that defective device is replaced with a new device to be tested at that time. The replaced device is tested starting with the subsequent test. A series of tests on the newly contacted device are conducted on the basis of the data stored in the corresponding defective test item storing portion. For example, if a defective device is generated in the third test, data "the third test" is stored in the corresponding defective test item storing portion. The newly replaced device is tested starting with the fourth test, and the final test thereof is the third test represented by the data stored in the corresponding defective test item storing portion.

When the second test is completed in step S14, the CPU 20 reads out the defective test item data stored in the defective test item storing portions 7a, 7b, 7c and 7d in step S15, and determines whether there is any defective test item data which coincides with the second test. If there is the defective test item data which coincides with the second test, the CPU 20 determines that a series of tests have been completed on that device, and removes that device from the contactor and brings a new device to the contactor in step S22.

In this way, a series of tests are executed.

Now, an example of the actual operation will be described with reference to the timing chart shown in FIG. 3. First, the devices 4a, 4b, 4c and 4d are electrically brought into contact with the contactors 8a, 8b, 8c and 8d, respectively, and then the first test cycle is executed on these four devices starting with the first test. It is to be noted that data "the Nth test" is stored beforehand in the defective test item storing portions 7a, 7b, 7c and 7d.

It is determined from the results of the third test that the device 4b contacting the contactor 8b is defective. At that time, data "the third test" is stored in the defective test item storing portion 7b of the storing unit 50, the defective device 4b is removed from the contactor 8b, and new device 4e is brought into contact with the contactor 8b. In that state, the subsequent fourth test is started. It is determined from the results of the fourth test that the device 4d contacting the contactor 8d is defective. At that time, data "the fourth test" is stored in the defective test item storing portion 7d corresponding to the device 4d, and a new device 4f is brought into contact with the contactor 8d. In that state, the subsequent fifth test is started.

Thereafter, the four devices 4a, 4c, 4e and 4f are tested until the Nth test is completed without being judged defective. Since data "the Nth test" has been stored beforehand in the defective test item storing portions 7a and 7c corresponding to the devices 4a and 4c, the CPU 20 determines that a series of tests have been completed on the devices 4a and 4c, and removes the devices 4a and 4c from the contactors 8a and 8c and brings new devices 4g and 4h into contact with the contactors 8a and 8c. Since a series of tests have not yet been completed on the devices 4b and 4d contacting the contactors 8b and 8d, they remain at the contactors 8b and 8d, and the test is continued.

The test is executed again starting with the first test. When the third test is completed, since data "the third test" is stored in the defective test item storing portion 7b, the CPU 20 determines that a series of tests have been completed on the device 4e contacting the contactor 8b, and removes the device 4e from the contactor 8b and brings new device 4i into contact with the contactor 8b. Similarly, since a series of tests have been completed on the device 4f contacting the contactor 8d when the fourth test is completed, the device 4f is removed and new device 4k is brought into contact with the contactor 8d.

Figure 3:
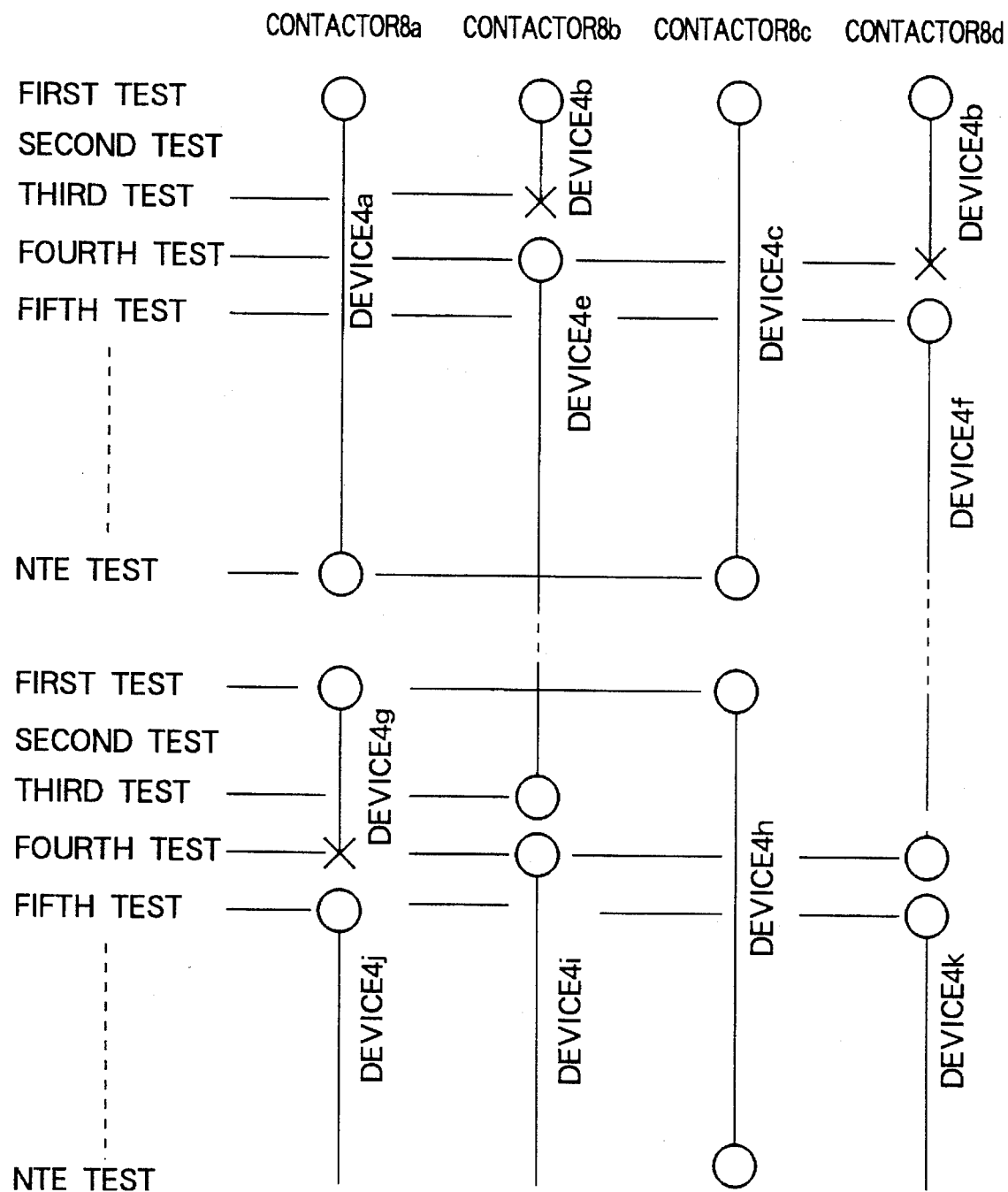
FIG. 3 is a timing chart showing the operation of the embodiment.
Figure 4:
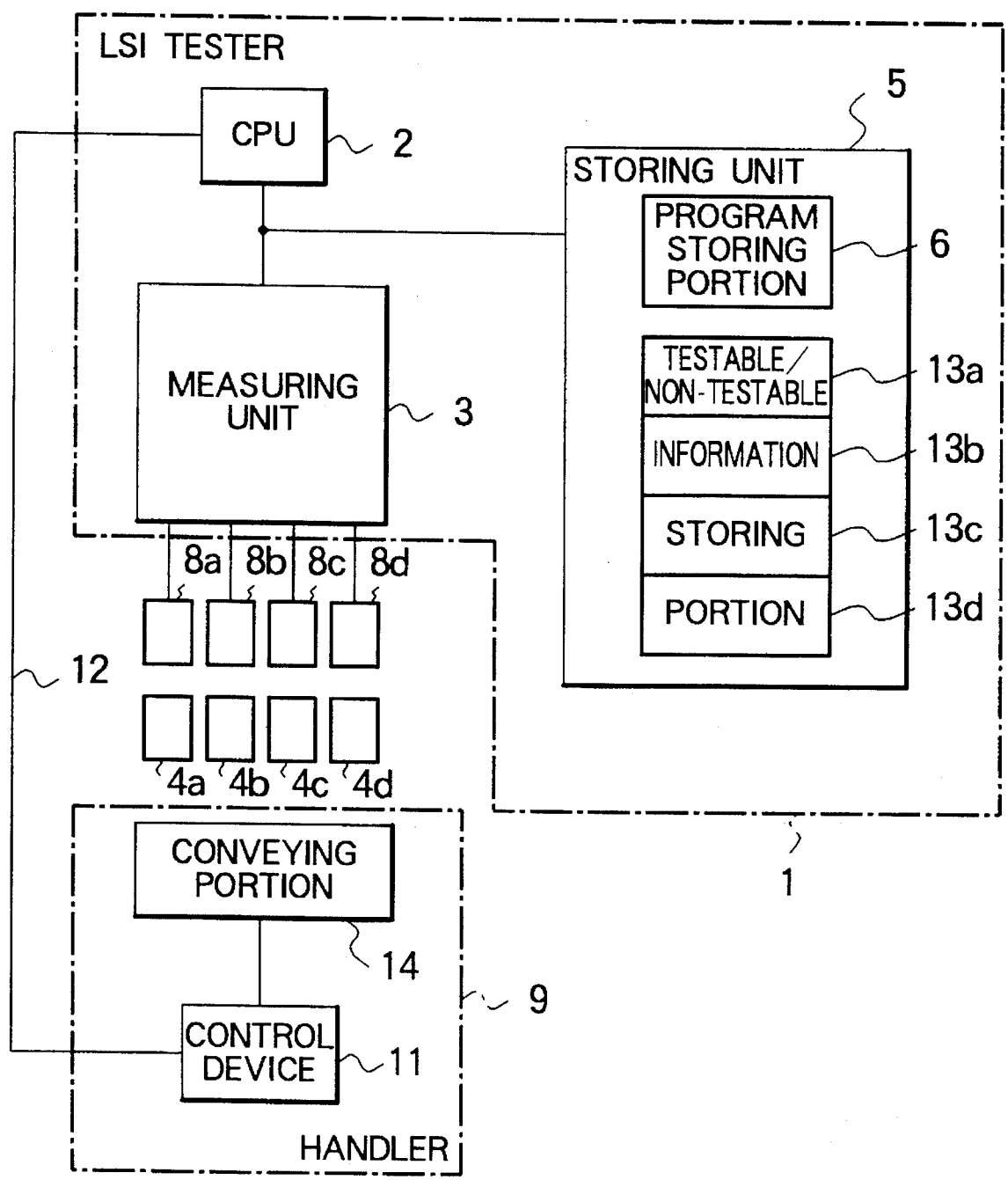
FIG. 4 is a block diagram showing a conventional testing system.
Figure 5:
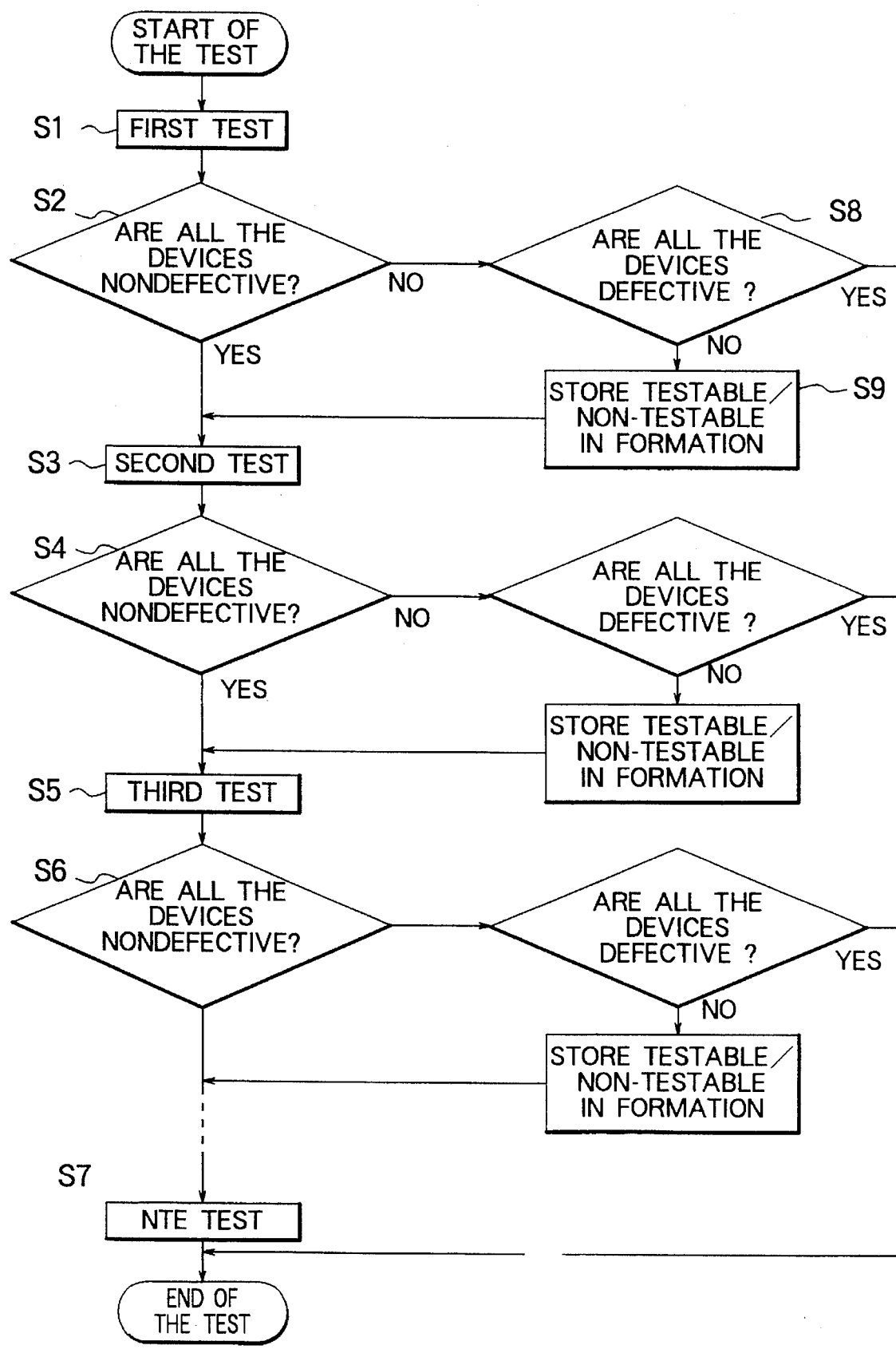
FIG. 5 is a flowchart showing the operation of a conventional system.
Figure 6:
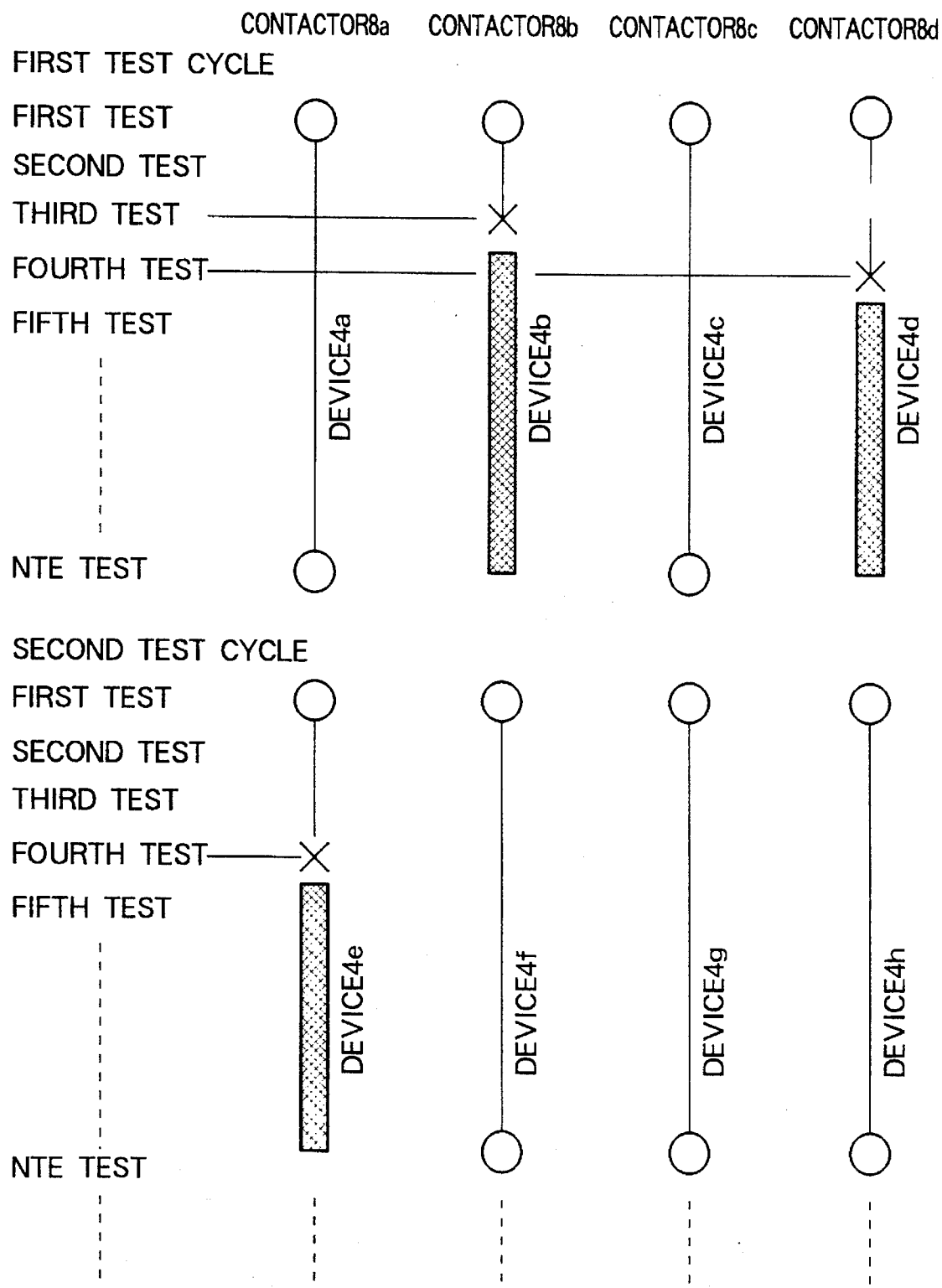
FIG. 6 is a timing chart showing the operation of the conventional system.

Further, in the example shown in FIG. 3, it is determined from the results of the fourth test that the device 4g contacting the contactor 8a is defective. As a result, data "the fourth test" is stored in the defective test item storing portion 7d corresponding to that device 4g, and a new device 4j is brought into contact with the contactor 8a. In that state, the subsequent fifth test is started.

Thus, when it is determined that the device is defective, that device is replaced with new one at once. Consequently, the defective device does not remain in the contactor for a long period of time, and the efficiency of the test is thus improved.

Examples of the tests are the output current test, the output voltage test, the power source voltage leakage test, the input leakage test, the function test, the open short test and so on. The open short test is conducted to investigate the protective diode characteristics in the device, an electrical contact failure between the device and the contactor and so on, and is characterized by a high failure generation rate.

Hence, if the open short test is executed first on the device which is brought into contact with the contactor in place of the device on which a series of tests have been completed or a defective device, the efficiency of the test is further improved, thus further improving the processing ability.

In the above-described embodiments, measurements were conducted concurrently on the four devices. However, the number of devices to be measured at one time is not limited to four; for example, up to 64 devices may be measured simultaneously.

What is claimed is:

1. A method of sequentially conducting a series of tests on a plurality of devices to be measured starting with a first test up to an Nth test, said method comprising the steps of:

conducting the series of tests on the plurality of devices to be measured in sequence starting with the first test, including testing each one of the plurality of devices simultaneously during each of the series of tests;

determining whether each of the devices to be measured is defective or non-defective each time one of the tests is completed;

interrupting the series of tests when a defective device is identified;

replacing the defective device with a new device to be measured, resuming the series of tests starting with a test subsequent to the test in which the defective device is identified.

2. A testing method according to claim 1 further comprising the step of subjecting the plurality of devices to be measured including the newly replaced device to an open short test before the series of tests are resumed.

3. A testing method according to claim 1, wherein the series of tests includes any of an output current test, an output voltage test, a power source voltage leakage test, an input leakage test, a function test and an open short test. devices to be measured is defective after any of said series of tests is completed, said CPU storing a defective test item in said defective test item storing portion corresponding to said device to be measured, allowing said handler to replace said device to be measured alone with a new device to be measured, and allowing said measuring portion to restart said series of tests starting from the test subsequent to said test.

4. A testing system for testing a plurality of devices, comprising:

a plurality of contactors a measuring unit coupled to said plurality of contactors for testing the plurality of devices to be measured simultaneously through said plurality of contactors and for determining whether the devices to be measured are defective or non-defective;

a program storing unit for storing programs corresponding to a series of tests;

a plurality of defective test item storing portions corresponding with said plurality of contactors for storing information regarding defective devices;

a handler for conveying the devices to be measured and bringing the devices into contact with corresponding contactors separately for each device; and a CPU for controlling said measuring portion to conduct the series of tests on said plurality of devices to be measured so that each device is tested simultaneously during each of the series of tests on the basis of the programs stored in said program storing unit and to interrupt the series of tests when a defective device is identified by said measuring unit, said CPU further storing a defective test item in a corresponding one of said plurality of defective test item storing positions, said CPU further controlling, said handler to replace the defective device with a new device to be measured and said CPU further controlling said measuring portion to restart the series of tests starting from a test subsequent to the test in which the defective device is identified.

5. A testing system according to claim 4 wherein said measuring portion conducts an open short test on said plurality of devices to be measured including the new device to be measured before the series of tests is restarted after a device which has been judged defective is replaced with a new device to be measured.

* * * * *

UNITED STATES PATENT AND TRADEMARK OFFICE
CERTIFICATE OF CORRECTION

PATENT NO. : 5,537,331
DATED : July 16, 1996
INVENTOR(S) : Shinonaga

It is certified that error appears in the above-indentified patent and that said Letters Patent is hereby corrected as shown below:

Column 7, delete lines 11 through 18.

Signed and Sealed this

Fifteenth Day of October, 1996

Attest:

BRUCE LEHMAN

*Attesting Officer*   *Commissioner of Patents and Trademarks*